United States Patent [19]

Sircar et al.

[11] 4,077,779
[45] Mar. 7, 1978

[54] HYDROGEN PURIFICATION BY SELECTIVE ADSORPTION

[75] Inventors: Shivaji Sircar, Allentown; John W. Zondlo, Pittsburgh, both of Pa.

[73] Assignee: Air Products and Chemicals, Inc., Allentown, Pa.

[21] Appl. No.: 732,609

[22] Filed: Oct. 15, 1976

[51] Int. Cl.² .......................................... B01D 51/00
[52] U.S. Cl. ......................................... 55/25; 55/62; 55/68
[58] Field of Search ............... 55/62, 68, 74, 58, 26, 55/25

[56] References Cited

U.S. PATENT DOCUMENTS

| | | | |
|---|---|---|---|
| 3,176,444 | 4/1965 | Kiyonuga | 55/58 |
| 3,226,913 | 1/1966 | Avery | 55/25 |
| 3,430,418 | 3/1969 | Wagner | 55/62 |
| 3,977,845 | 8/1976 | Walter | 55/68 X |
| 4,021,210 | 5/1977 | Streich et al. | 55/68 X |

*Primary Examiner*—Charles N. Hart
*Assistant Examiner*—E. Rollins Cross
*Attorney, Agent, or Firm*—Richard A. Dannells, Jr.; Barry Moyerman; E. Eugene Innis

[57] ABSTRACT

Hydrogen-containing gas mixtures are subjected to selective adsorption in a pressure swing cyclic system to remove carbon dioxide and/or hydrocarbon gases, obtaining high recovery of hydrogen at high purity. The system can also be employed for separation of methane from admixture with $CO_2$.

15 Claims, 2 Drawing Figures

HYDROGEN PURIFICATION BY SELECTIVE ADSORPTION

BACKGROUND OF THE INVENTION

1. Field of the Invention

This invention relates generally to bulk separation of gaseous mixtures and is particularly concerned with recovery of substantially pure hydrogen by selective adsorption from such mixtures of carbon dioxide and/or hydrocarbon gases in a pressure swing system. The system of the invention is also applicable to separation of $CO_2$ from its admixture with methane.

2. Prior Art

Pressure swing cyclic systems designed for fractionation of gaseous mixtures of selective adsorption are well known in the art. In these systems one or more desired components of the gaseous mixture are separately recovered at a yield and purity depending upon the efficiency of the designed operation.

Illustrative of typical systems indicated to be especially useful in the recovery of hydrogen from gaseous mixtures with $CH_4$ and/or $CO_2$ are those described in U.S. Pat. Nos. 1,934,075; 3,104,162; 3,138,439; 3,142,547; 3,237,379; 3,788,037. Other patents describe in general, systems for separation of essentially binary gas mixtures or of multicomponent gas mixtures, asserted to be applicable in recovery of hydrogen from gas mixtures. Illustrative of these are the systems described in U.S. Pat. Nos. 3,102,013; 3,149,934; 3,176,444; 3,221,476; 3,323,288; 3,430,418; 3,619,984; 3,720,042. While certain of these disclosed processes are stated to obtain a hydrogen product of high purity, such high purity can be practically obtained only at a sacrifice in yield of recovered hydrogen product.

In U.S. Pat. No. 3,751,878 a cyclic adsorbent process is disclosed for the bulk separation of carbon dioxide from its admixture with methane and/or other gases including hydrogen, for the purpose of recovering the methane as such. The recovered methane product also contains the unseparated hydrogen and carbon monoxide.

Certain of these prior art patents typically employ a plurality of parallel columns arranged to undergo, in timed cycle sequence, the steps of (1) adsorption of the undesired component from the feed gas at elevated pressure and withdrawal of part of the effluent gas as desired product; (2) pressure reduction of the column to desorb the contained gas component(s); (3) purging of the column, generally with part of the primary effluent from (1); and repressuring the column with feed gas or with effluent from the first step. Among the different types of adsorbents suggested in the various patents, mention is made of molecular sieve zeolites of stated pore size, silica gel, activated charcoal or carbon, and others.

In the developments leading to the present invention, applicants have found certain of the key problems to be solved for efficient separation of gases by pressure swing adsorption to be:

(a) The manner of treating the void gas in the column after termination of the adsorption step. The handling of the void gas determines the ultimate extent of product recovery. At high operating pressure a large amount of the desired component of the feed gas remains in the void spaces of the column.

(b) The manner of regeneration or cleaning of the column following pressure reduction. The manner and extent of cleaning the column largely determine the quality of the recovered component.

Both (a) and (b) are critical for efficient and economic operation of the pressure swing adsorption schemes. Severe economic penalty results from loss of the desired component of the feed mixture in the void gas, particularly hydrogen, and from an inefficient regeneration step.

According to the process of the present invention, the several disadvantages of the process schemes of the prior art are overcome, and an operational system has been developed by which hydrogen can be recovered from a gas mixture at a purity of $99+\%$ and at a recovery of over 95% and up to about 99%.

SUMMARY OF THE INVENTION

The invention entails essentially the following sequence of steps carried out in timed relation in each of a plurality of sorbent columns operated in parallel:

(a) Flow of a feed gas mixture at desired superatmospheric feed pressure through a column containing a sorbent bed which selectively sorbs $CO_2$ and/or hydrocarbon contaminants and collecting as primary product an effluent rich in the desired unadsorbed component of the feed gas.

(b) Terminating the flow of feed gas to the column at or just short of breakthrough of the undesired component(s) at the exit end of the column, and in the feed direction purging the column with a stream of the previously collected and compressed undesired component (e.g. $CO_2$) at about the feed pressure as in step (a) above, thereby removing from the column and recovering the leftover gas in the voids of the sorbent bed and any sorbed primary component from the column. In preferred practice, at least a portion or preferably all of the effluent gas during this step is recycled to an adsorbent bed then on adsorption.

(c) Reducing the pressure of the column to a desired intermediate pressure and withdrawing an exit gas mainly comprising the more strongly sorbed component(s) of the original feed gas. Part of this exit gas is to be employed in rinsing a column undergoing step (b) and the remainder may be recovered as a secondary by-product, if desired.

(d) Purging the column at the reduced pressure with an extraneous gas to remove most of the remaining portion of the undesired component left over from the previous step (c), the extraneous gas being one that is less strongly adsorbed in the bed than the component being stripped thereby.

(e) Evacuating the bed to still lower pressure, to remove the extraneous gas employed in step (d) and any residual quantity of the undesired sorbed component yet remaining in the column.

(f) Repressuring the column that has undergone the foregoing sequence of steps to original feed pressure by introducing part of the primary effluent from step (a).

(g) Repeating the described sequence of steps starting with step (a).

The salient advantages obtained by the operation in accordance with this invention are:

(1) High purity of the obtained primary product stream at high recovery.
(2) High purity of the secondary product stream.
(3) Efficient utilization of the adsorbent column.
(4) Efficient utilization of the feed pressure energy.

The operation of the invention will be understood and certain of its advantages more fully appreciated from the detailed description which follows read in connection with the accompanying drawings illustrating practical embodiments of systems in which the invention may be practiced.

IN THE DRAWINGS

DETAILED DESCRIPTION OF PREFERRED EMBODIMENTS

Figure 1:
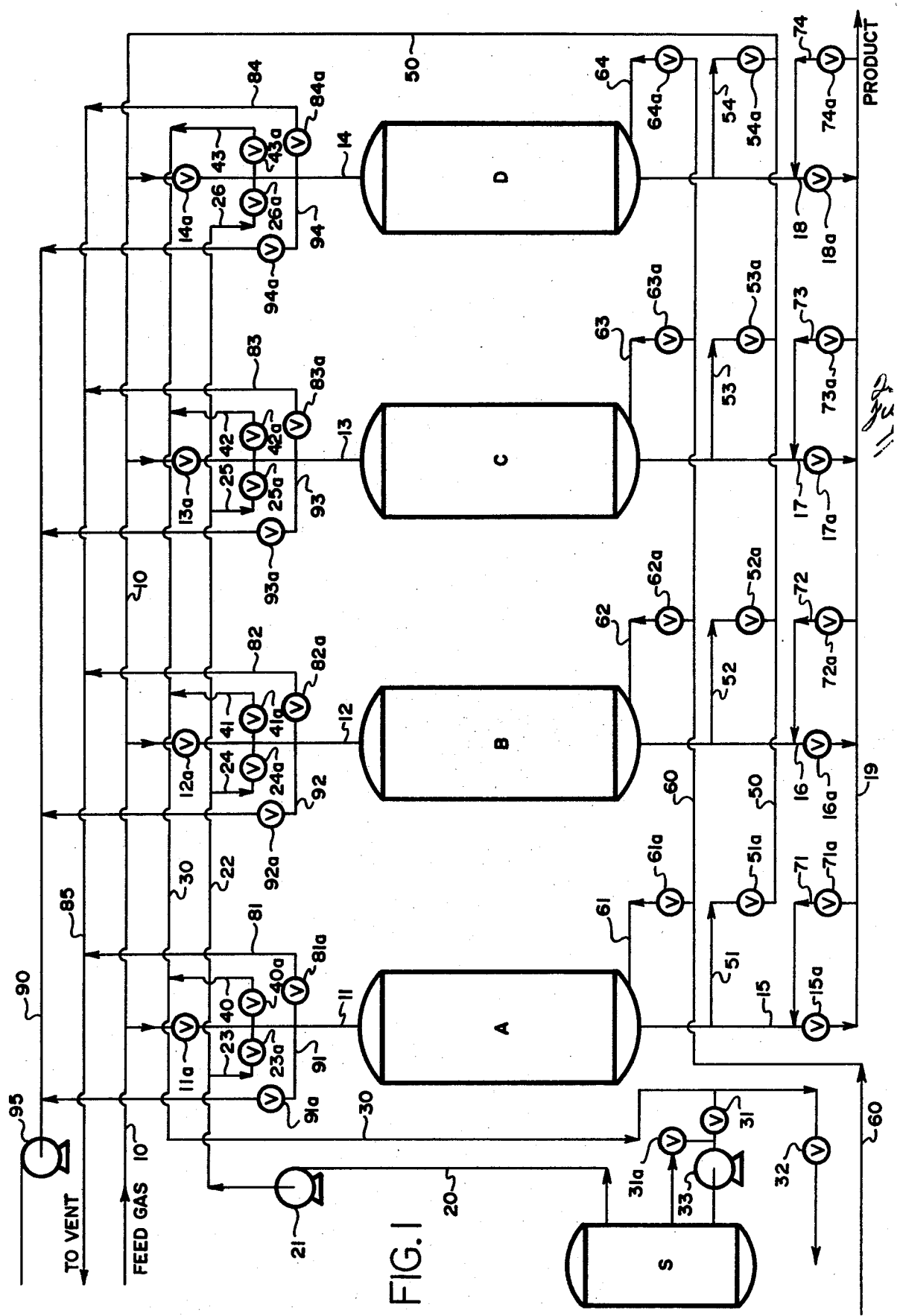
FIG. 1 is a process flow diagram of an embodiment utilizing four adsorption columns operated in a timed sequence cycle.

Referring now to FIG. 1 of the drawings, the four adsorption columns each containing a bed of solid adsorbent, are labeled A, B, C and D. The feed gas is introduced into a selected one of the adsorption columns through a manifold 10 from which branch inlet lines 11, 12, 13 and 14 connect respectively to the individual columns A, B, C and D. Each of the branch lines is equipped with a valve 11a, 12a, 13a and 14a respectively. Opening of the appropriate valve permits flow of feed gas from the manifold 10 into the selected column being initially placed on stream. Thus, by opening valve 11a, while valves 12a, 13a and 14a are closed, the feed gas will flow from manifold 10 into column a through line 11.

Each of the columns A, B, C, D is further provided at its end opposite to that of the corresponding feed gas inlet line, with a gas conduit labelled respectively 15, 16, 17, 18 and having respectively exit control valves 15a, 16a, 17a, 18a. All of the conduits 15, 16, 17, 18 are connected to a gas discharge manifold 19 through which primary gas effluent can be withdrawn. By opening the appropriate valve 15a, 16a, 17a or 18a gas will flow from the corresponding associated column through the connecting conduit in which the opened valve is located, into discharge manifold 19.

The system further comprises a gas storage tank, labelled S, from which stored gas can be withdrawn by line 20 under control of blower 21 in the line. The blower 21 discharges the gas into a manifold 22 through which the previously stored gas can be sent as desired, to a selected column A, B, C or D through the appropriate connecting line. Thus, leading from manifold 22 to inlet line 11 of adsorber A is a connecting line 23 equipped with a valve 23a. With valve 23a open, gas will flow from manifold 22 into column A through lines 23 and 11. In the same manner each of the columns B, C, and D can be put in flow communication with manifold 22 through individually associated connecting lines 24, 25, 26 and opening of the proper selected valve 24a, 25a or 26a.

Gas is admitted to storage vessel S from a manifold 30 under control of a valve system 31, 32. Valve 31, when open, connects manifold 30 in flow communication with the inlet of a compressor 33, the discharge side of the compressor being connected to storage vessel S. Valve 32, when opened, permits the gas in manifold 30 to be discharged to vent or any other desired location. With valves 31 and 32 both partly open to desired extent, the stream of gas in manifold 30 can be split so that the desired portion thereof passes through compressor 33 and into vessel S, while the remainder discharges through valve 32.

Gas can enter manifold 30 from each of the columns A, B, C and D under valved control as hereinafter described. Connected to line 11 associated with column A, is a line 40 leading to manifold 30 through a valve 40a. Under conditions hereinafter described, with valve 11a being closed, gas can be withdrawn from column A and discharged into manifold 30 by way of lines 11 and 40 when valve 40a is opened. In similar manner, each of columns B, C and D respectively, can selectively be placed in flow communication with manifold 30 through individually associated connecting lines 41, 42, 43 under control of valves 41a, 42a and 43a respectively.

Opposite to their gas feed inlet ends, the columns A, B, C and D respectively, are connected to a gas manifold 50 by conduits 51, 52, 53, 54 between manifold 50 and the respective gas withdrawal lines 15, 16, 17, 18, under individual control by associated valves 51a, 52a, 53a, 54a. Manifold 50 discharges the gas therein into manifold 10.

Also connected to each of the columns, A, B, C, D at the end opposite the feed inlet, is a gas distributing manifold 60 through which stripping gas from an extraneous source may be admitted to the column. Thus, manifold 60 has branch lines 61, 62, 63, 64 connecting to the individual columns A, B, C, D respectively, under control of associated valves 61a, 62a, 63a, 64a.

Means are also provided for admission of a controlled portion of primary product gas to the individual columns for flow into the column in a direction opposite to that of the feed gas. Thus, manifold 19 is provided with branch lines 71, 72, 73, 74 connecting the manifold in flow communication with each of the columns A, B, C, D respectively. The branch lines 71, 72, 73, 74 respectively are equipped with flow regulating valves 71a, 72a, 73a, 74a respectively, which can be set to fix the quantity and rate of gas flow from manifold 19 admitted into the selected column directly or through its associated conduit 15, 16, 17, 18, when the corresponding gas withdrawal valve 15a, 16a, 17a, or 18a is in its closed position.

For discharge from the particular column of the gas admitted thereto from manifold 60, together with entrained gas thereby stripped from the column, each of the columns A, B, C, D is provided at its feed inlet and with a vent connection 81, 82, 83, 84 respectively, under control of associated valve 81a, 82a, 83a, 84a. The vent connections 81 through 84 may be directly connected to the feed ends of the respective columns, or, as illustrated in FIG. 1, the connection may be made through the associated lines 11, 12, 13, 14, with the corresponding valve 11a, 12a, 13a, or 14a being in closed position. Lines 81, 82, 83, 84 may individually discharge the withdrawn gas to the atmosphere or into a collecting manifold 85, as illustrated in FIG. 1, for desired ultimate disposition.

Means are also provided for evacuation of each of the columns through line 90 which is connected to a vacuum pump 95. Each of the columns A, B, C, D respectively, is connected to line 90 through an associated branch line 91, 92, 93, 94 respectively, under control of a corresponding valve in each of these lines 91a, 92a, 93a, 94a respectively.

The operation of an embodiment of the invention corresponding to FIG. 1 will now be explained in connection with an arbitrarily chosen 16 minute cycle as set out in Table 1.

As illustrated for example, column D is to be put on stream for adsorption of $CO_2$ from a mixture comprising hydrogen and $CO_2$. During the first minute of the cycle, column D has been brought to desired operating pressure as will hereinafter appear. To place column D on the adsorption step in the cycle, the gas to be purified is admitted thereto from feed gas manifold 10 by opening valves 14a and 18a, all other valves associated with column D being in closed position. The feed gas will thus flow into column D through line 14. The $CO_2$ in the feed gas will be retained buy the sorbent in the column and the unadsorbed gas, comprising substantially pure hydrogen, will be discharged through conduit 18 into collecting manifold 19. In the illustrated 16 minute cycle, each column is on adsorption for 4 minutes. During the fourth minute of the adsorption step, a portion of the product gas is utilized to prepressure the next column to be placed on adsorption. Thus, in the example illustrated, after column D has been on adsorption for the first 3 minutes, valve 71a is opened to controlled required extent to permit a portion of the hydrogen gas in line 19 to flow into column A through line 71 and conduit 15 at a controlled rate.

The flow of feed gas into column D is then terminated by closing valves 14a and 18a and column A placed on adsorption by now closing valve 71a and opening valves 11a and 15a. During this same period that column A is put on stream, column D is purged to remove leftover gas in the voids thereof (essentially feed gas) and the contents of the mass transfer zone retained in the column at the end of the adsorption step. The rinsing of the columns is accomplished by flowing previously collected secondary effluent through the column in a direction co-current to that of the feed gas and at about the feed pressure. Thus, in the illustrated example, $CO_2$ is withdrawn from storage vessel S and passed through line 22 into column D through branch line 26 and opened valve 26a. The gas swept out of column D by the rinse gas is discharged from the column through line 54 and opened valve 54a into line 50 discharging into line 10, thus entering column A together with the feed gas being admitted thereto.

At the conclusion of the rinsing of column D with the $CO_2$ gas by closing valves 26a and 54a, column D is subjected to desorption of the gas held in the adsorbent bed ($CO_2$). This is effected by now opening valve 43a, permitting the pressure in column D to be reduced to atmospheric pressure or to an intermediate pressure by withdrawal of the secondary effluent (carbon dioxide) through line 43 and manifold 30. Valves 31 and 32 being opened, part of the gas in line 30 is compressed at 33 and discharged into vessel S while the remainder is discharged through valve 32 to be vented or collected as the secondary product stream for any desired use.

To terminate the desorption step in column D, valve 43a is now closed and that column subjected to a second rinse; this time with an extraneous gas. This is accomplished by opening valve 64a permitting gas from manifold 60 to flow into the column through line 64 in a direction counter to that of the feed gas. The admitted purge or rinse gas flows through column D and sweeps out most of the undesired gas component leftover in the column after the preceding desorption step. During this rinsing step, valve 84a is open so that the gaseous effluent flows through line 84 into manifold 85 to be vented, or if desired, line 84 may be vented to the atmosphere directly. The rinse gas employed in this step may be partially or completely pre-dried air. The air may be dried by flowing it through a separate drying column prior to its entry into the main adsorption column or a layer of desiccant may be provided at the bottom of the column. Since air is less strongly adsorbed and its capacity at or near the ambient pressure is much less than that of $CO_2$, this rinsing or purging step reduces the load on the vacuum pump in the subsequent evacuation step. The use of air is permissible because the column at the end of the desorption step contains, if any, only trace quantities of combustible gas (hydrogen) initially present in the feed mixture. If the initial feed mixture is such (e.g. one containing methane) that there is danger of possible combustion in using air, an inert gas such as nitrogen may be substituted for the air.

After rinsing column D with air or inert gas to the required extent, valves 64a and 84a are closed and evacuation of the column to the lowest employed pressure is initiated. Evacuation is effected by opening valve 94a, thus permitting the remaining gas content of column D to be withdrawn through line 94 into line 90 under the influence of a vacuum pump in that line.

When column D has been evacuated to desired lowest pressure valve 94a is closed and column D is brought to desired feed pressure by admission thereto of product gas effluent ($H_2$) from an on-stream column. Thus, in the example illustrated, valve 74a is now opened to admit gas from product line 19 through line 74. The product in line 19 will be coming from column C which is then on adsorption, discharging into line 19 through open valve 17a. After repressuring, column D is ready to resume admission of feed gas and to repeat the recited sequence of steps in the operation cycle.

Each of the other columns A, B, C, in turn, goes through the same sequence of steps as above described for column D. The order of these steps and the timing during the illustrated 16 minute cycle is charted in Table 1. The position of the valves during each increment of the cycle is shown in Table 2. The 16 minute cycle is chosen arbitrarily for purpose of illustration. Other cycle times may, of course, be employed.

For selective adsorption of $CO_2$ or light gaseous hydrocarbons from admixtures containing hydrogen or separation of $CO_2$ from methane, the preferred adsorbent is activated carbon. Other solid adsorbents that can be employed include molecular sieve zeolites such as 5A, molecular sieve carbons, silica gel, activated alumina, or mixtures of these or other adsorbents capable of selectively retaining $CO_2$ and/or low molecular weight hydrocarbons while passing hydrogen at the operating conditions.

The pressure to be employed during the adsorption step will depend largely on the pressure of the available gas mixture to be purified. The actual feed pressure may vary over a wide range from above atmospheric. Preferably, the feed pressure should be at least 50 psia; during the desorption step the column is brought to an intermediate pressure in the range of 15 to 30 psia and the final evacuation may be to a pressure of 50 to 300 torr.

The length of time to be assigned for the adsorption step is chosen with reference to the capacity of the adsorbent bed in the column. In general, the adsorption step is preferably continued until or just short of breakthrough of the undesired component ($CO_2$ in the illustrated case) at the exit end of the column. Similarly, in rinsing or purging the column with the secondary effluent ($CO_2$), this step is continued until the sorption front rich in this component ($CO_2$) is about to break through the exit end of the column.

The opening and closing of the various valves in proper sequence is effected by the use of a cycle timer, as is well known in the art.

To maintain compressor 33 operating continuously when valve 31 is closed, stored gas from vessel S may be internally recycled through the compressor by provision of a by-pass valve as indicated at 31a, or other suitable means employed as is well known in compressor design.

TABLE 1

| Time (min) | Column A | Column B | Column C | Column D |
|---|---|---|---|---|
| 0–1 | Evacuation | Desorption | Adsorption | Repressurization |
| 1–2 | " | Rinse 2 | Rinse 1 | Adsorption |
| 2–3 | " | " | Desorption | " |
| 3–4 | " | " | Desorption | " |
| 4–5 | Repressurization | Evacuation | " | " |
| 5–6 | Adsorption | " | Rinse 2 | Rinse 1 |
| 6–7 | " | " | " | Desorption |
| 7–8 | " | " | " | Desorption |
| 8–9 | " | Repressurization | Evacuation | " |
| 9–10 | Rinse 1 | Adsorption | " | Rinse 2 |
| 10–11 | Desorption | " | " | " |
| 11–12 | " | " | " | " |
| 12–13 | " | " | Repressurization | Evacuation |
| 13–14 | Rinse 2 | Rinse 1 | Adsorption | " |
| 14–15 | " | Desorption | " | " |
| 15–16 | " | " | " | " | desorption, (d) rinse with air or inert gas, (e) evacuation, (f) repressuring.

Figure 2:
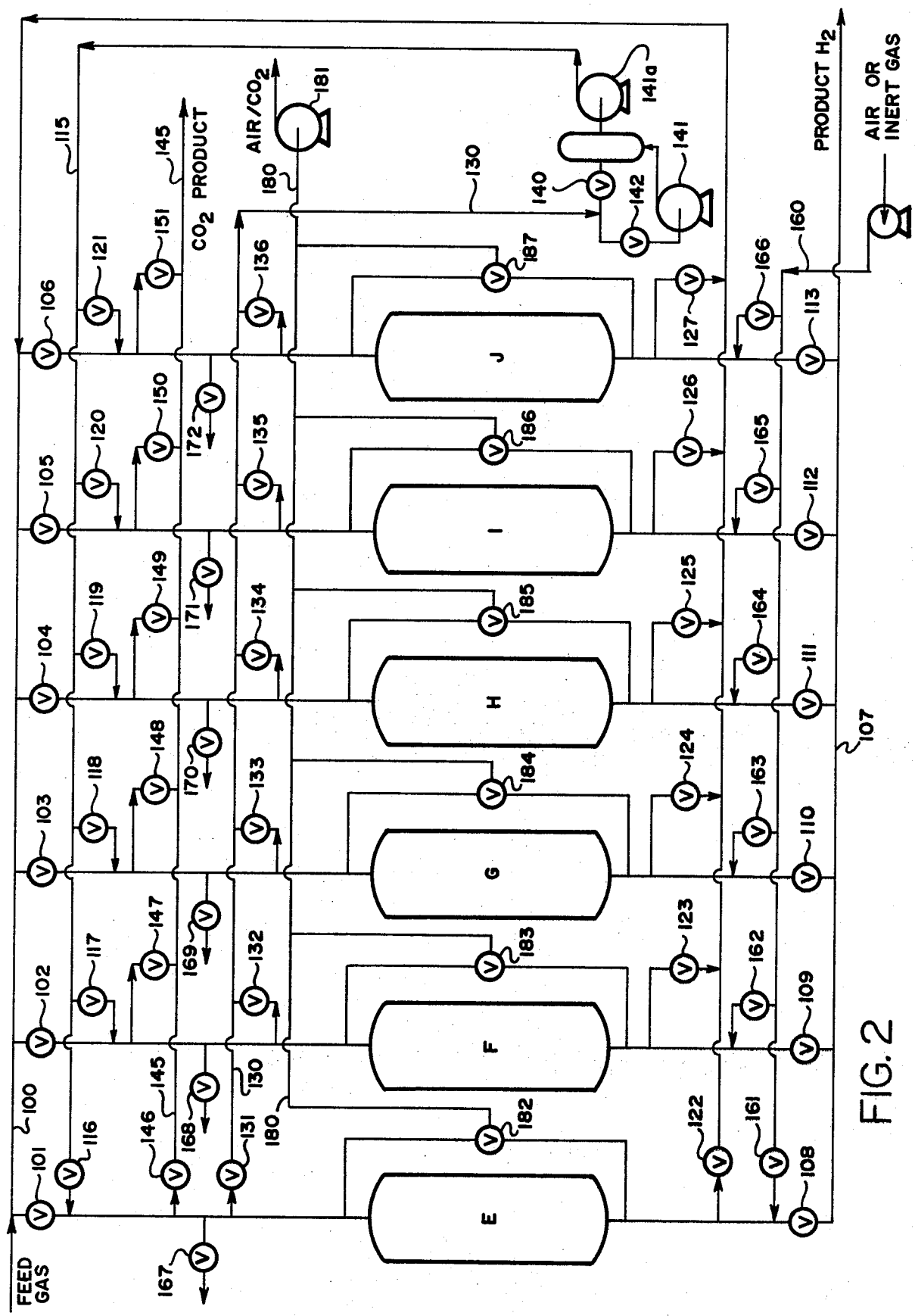
FIG. 2 is a process flow diagram illustrating another embodiment in which six adsorbent columns are employed.

In the modified embodiment shown in FIG. 2, six adsorption columns are employed, labelled E through J.

This embodiment provides continuous operation of the compressor and the vacuum pump and eliminates the storage tank(s) otherwise required in the previously described embodiment. The gas feed manifold is placed in flow communication with the column to be placed on stream, by opening the associated valve 101, 102, 103, 104, 105 or 106, in the line leading to the inlet end of the column. In the illustrated embodiment, the feed gas inlet is at the top end of the column. The primary product effluent, (i.e. unadsorbed gas) is discharged into a manifold 107 through a line at the opposite end of the column through an open control valve 108, 109, 110, 111, 112, or 113. It will be understood that when the feed gas inlet valve to a particular column is open, the corresponding discharge valve at the opposite end of the same column will also be open to permit the unadsorbed component(s) of the feed gas mixture to be discharged into manifold 107. Thus, when column E is on stream receiving the gas mixture to be fractionated through open valve 101, the corresponding valve 108 will be open to discharge the unadsorbed gas component into manifold 107.

Rinsing of the column with the secondary effluent (for example, $CO_2$) is effected by introduction into the column of the rinse gas from a manifold 115, by opening the appropriate valve 116, 117, 118, 119, 120 or 121,

TABLE 2

| Valve | 0–1 | 1–2 | 2–3 | 3–4 | 4–5 | 5–6 | 6–7 | 7–8 | 8–9 | 9–10 | 10–11 | 11–12 | 12–13 | 13–14 | 14–15 | 15–16 |
|---|---|---|---|---|---|---|---|---|---|---|---|---|---|---|---|---|
| 11a | C | C | C | C | C | O | O | O | O | C | C | C | C | C | C | C |
| 12a | C | C | C | C | C | C | C | C | C | O | O | O | O | C | C | C |
| 13a | O | C | C | C | C | C | C | C | C | C | C | C | C | O | O | O |
| 14a | C | O | O | O | O | C | C | C | C | C | C | C | C | C | C | C |
| 15a | C | C | C | C | C | O | O | O | O | C | C | C | C | C | C | C |
| 16a | C | C | C | C | C | C | C | C | C | O | O | O | O | C | C | C |
| 17a | O | C | C | C | C | C | C | C | C | C | C | C | C | O | O | O |
| 18a | C | O | O | O | O | C | C | C | C | C | C | C | C | C | C | C |
| 23a | C | C | C | C | C | C | C | C | C | O | C | C | C | C | C | C |
| 24a | C | C | C | C | C | C | C | C | C | C | C | C | C | O | C | C |
| 25a | C | O | C | C | C | C | C | C | C | C | C | C | C | C | C | C |
| 26a | C | C | C | C | C | O | C | C | C | C | C | C | C | C | C | C |
| 31 | O | C | O | O | O | C | O | O | O | C | O | O | O | C | O | O |
| 32 | O | C | O | O | O | C | O | O | O | C | O | O | O | C | O | O |
| 40a | C | C | C | C | C | C | C | C | C | C | O | O | O | C | C | C |
| 41a | O | C | C | C | C | C | C | C | C | C | C | C | C | C | O | O |
| 42a | C | C | O | O | O | C | C | C | C | C | C | C | C | C | C | C |
| 43a | C | C | C | C | C | C | O | O | O | C | C | C | C | C | C | C |
| 51a | C | C | C | C | C | C | C | C | C | O | C | C | C | C | C | C |
| 52a | C | C | C | C | C | C | C | C | C | C | C | C | C | O | C | C |
| 53a | C | O | C | C | C | C | C | C | C | C | C | C | C | C | C | C |
| 54a | C | C | C | C | C | O | C | C | C | C | C | C | C | C | C | C |
| 61a | C | C | C | C | C | C | C | C | C | C | C | C | C | O | O | O |
| 62a | C | O | O | O | C | C | C | C | C | C | C | C | C | C | C | C |
| 63a | C | C | C | C | C | O | O | O | C | C | C | C | C | C | C | C |
| 64a | C | C | C | C | C | C | C | C | C | O | O | O | C | C | C | C |
| 71a | C | C | C | C | O | C | C | C | C | C | C | C | C | C | C | C |
| 72a | C | C | C | C | C | C | C | C | O | C | C | C | C | C | C | C |
| 73a | C | C | C | C | C | C | C | C | C | C | C | C | O | C | C | C |
| 74a | O | C | C | C | C | C | C | C | C | C | C | C | C | C | C | C |
| 81a | C | C | C | C | C | C | C | C | C | C | C | C | C | O | O | O |
| 82a | C | O | O | O | C | C | C | C | C | C | C | C | C | C | C | C |
| 83a | C | C | C | C | C | O | O | O | C | C | C | C | C | C | C | C |
| 84a | C | C | C | C | C | C | C | C | C | O | O | O | C | C | C | C |
| 91a | O | O | O | O | C | C | C | C | C | C | C | C | C | | | |
| 92a | C | C | C | C | O | O | O | O | C | C | C | C | C | C | C | C |
| 93a | C | C | C | C | C | C | C | C | O | O | O | O | C | C | C | C |
| 94a | C | C | C | C | C | C | C | C | C | C | C | C | O | O | O | O |

C = Closed
O = Open

While in FIG. 1 four adsorption columns are employed, it will be understood that the number of columns will depend upon the cycle program. Regardless of the number of columns, each of these in sequence will go through the steps of (a) adsorption, (b) first rinse, (c) associated with the column to be purged; that is, the column which has just completed its adsorption step. During this rinsing step, which is carried out in a direction co-current to that of the feed gas, the corresponding associated discharge valve is also open, from among valves 122, 123, 124, 125, 126, 127, thus connecting the column to collection manifold 128. Manifold 128, as is shown, can be employed to recycle the gas therein to the inlet end of a column in which one of the valves 101 through 106 is open; that is, the column receiving feed gas during the adsorption step.

Desorption of the column is carried out by depressurizing the column in a direction opposite to the direction of feed gas flow, through a line 130. The column to be desorbed is placed in flow communication to line 130 by opening the associated valve, 131, 132, 133, 134, 135 or 136. A part of desorbed gas discharged into line 130 is recompressed and used as rinse gas in another adsorber undergoing the high pressure rinse step. The remaining portion of the desorbed gas not so recycled may be collected as a secondary product. Recompression is effected by first flowing the gas in line 130 through opened valve 140 into the first stage 141a of a compressor, then closing valve 140 and opening valve 142, so that the gas flows through both stages 141 and 141a of the compressor. It will be understood that the invention is not limited to use of a two stage or multistage compressor. A single stage compressor of suitable design can be employed if desired, depending upon the desorption characteristics and the purge requirements of the particular application. The discharge outlet of the compressor connects with manifold 115 by means of which the particular column to be purged can be supplied with the high pressure gas through the opened valve connecting the column to manifold 115.

When it is desired to terminate flow of the compressed rinse gas into the column, the associated connecting valve is closed and the gas directed into line 145 by opening the appropriate associated valve, 146, 147, 148, 149, 150 or 151. The desorbed gas in line 145 is discharged as secondary effluent, which can be collected and stored for any desired use.

The second rinsing of the column with extraneous gas such as air or inert gas, is effected in a direction countercurrent to that of the feed gas, by admission of the relatively low or ambient pressure rinse gas from manifold 160. Manifold 160 connects to the columns E to J respectively through valves 161, 162, 163, 164, 165, 166. Corresponding discharge valves are provided at the opposite ends of the columns, labelled respectively 167, 168, 169, 170, 171, 172, through which valve, when open, the discharged rinse gas can be vented.

Evacuation of the column to lowest desired pressure is effected through line 180 by means of a vacuum pump 181. The individual columns are placed in flow communication with line 180 by opening the appropriate three-way valve 182, 183, 184, 185, 186 or 187. As illustrated in FIG. 2, evacuation can be carried out by withdrawing residual gas therein simultaneously at both ends of the column. Alternatively, evacuation can be carried out by withdrawing the gas from the center of the column.

In operation of the system illustrated in FIG. 2, each column undergoes the sequence of steps hereinafter described under control of a cycle timer. The step in the cycle being carried out by each column at a particular time period in the cycle is charted in Table 3. The position of the valves during each particular time period is shown in Table 4. A 24 minute time period is arbitrarily chosen for illustration, with column E being first on-stream to receive the feed gas to be fractionated. The sequence of steps will be described with reference to column E, it being understood that the same is applicable to each of the other five columns in this system.

The feed mixture is introduced into column E (which has previously been brought up to feed pressure by primary product gas) by opening inlet valve 101. Valve 108 is also simultaneously opened so that the unadsorbed product gas passing through column E discharges into manifold 107. Thus, if the feed mixture comprises $H_2$ with $CO_2$ and/or with $CH_4$, the unadsorbed primary effluent discharged into manifold 107, will consist of essentially pure hydrogen. To terminate the adsorption step, valves 101 and 108 are closed and valves 116 and 122 opened immediately thereafter to initiate the first high pressure rinse or purge. This valve change would take place in preferred practice at a predetermined time when the mass transfer zone for the adsorption step reaches the discharge end of column E. With the opening of valves 116 and 122, a stream of essentially pure secondary component of the feed mixture passes through column E at the feed pressure and in the same direction as that of the feed gas flow. The exit gas is discharged into manifold 128, which is connected to feed gas line 100. Since, in the charted example, column F is now on its adsorption step receiving feed gas through opened valve 102, the gas from manifold 128 will enter column F together with the feed gas.

The high pressure rinse of column E is terminated at the predetermined time when the mass transfer zone for this step reaches the bottom of column E, by closing valves 116 and 122. Valve 131 is now opened to reduce the pressure in column E and thereby desorb the column countercurrent to direction of feed. In the illustrated embodiment, the desorbed gas passes through open valve 131 into line 131 and is recompressed by the two stage compressor 141, 141a, as hereinabove previously described. The recompressed gas is discharged into manifold 115. At this time column F will be on its high pressure rinsing step with valves 117 and 123 being open, so that the rinse gas from line 115 will pass through column F. After column E has reached a certain predetermined pressure level, valve 131 is closed and valve 146 opened, to admit the desorbing gas to be discharged into line 145, from which line secondary product gas is withdrawn. At the termination of the desorption step (by depressuring) valve 146 is closed and column E is rinsed with ambient air or other inert extraneous gas at the existing pressure. This gas is passed through the column in a direction countercurrent to that of the feed gas, by opening valves 161 and 167. Following this rinsing with air (or inert gas) valves 161 and 167 are closed and valve 182 opened to evacuate the vessel to desired lowest pressure through line 180 and vacuum pump 181.

In the embodiment illustrated in FIG. 2, evacuation is shown as being effected simultaneously at the top and bottom of the column. This is desirable in columns of relatively large size. Alternatively, particularly for large columns, evacuation may be effected at the middle of the column. In smaller size columns particularly, evacuation from both ends of the column need not be practiced. In such instance evacuation is preferably effected by gas withdrawal in a direction counter to that of the feed gas introduction. When column E has been brought to desired lowest pressure valve 182 is closed and the column repressured by introduction of the substantially pure primary product gas then being discharged from column J which is at that time on adsorption. This is accomplished by now opening valve 108 at a controlled rate, thus permitting part of the product gas in conduit 107 to pass upwardly into column E, while valve 101 remains closed. The complete sequence of operations in column E is then repeated when the column has been brought to feed pressure, by now opening valve 101 to receive fresh charge of feed gas from manifold 101 including recycled gas from conduit 128 then being discharged into that conduit from column J through opened valve 127, column J at that time undergoing high pressure rinsing.

It will be understood that each of the columns E through J, in turn, undergoes the described sequence of operations as set out in Table 3. While a 24-minute cycle was arbitrarily chosen for purpose of illustrating this embodiment of the invention, it will be understood that other cycle times may be employed. It will be noted that in the embodiment of FIG. 2, the $CO_2$ storage tank (S in FIG. 1) is eliminated, and the two stage compressor 141, 141a operated continuously to compress gas charged thereto by line 130 and to direct the compressed gas into manifold 115.

TABLE 3

| TIME (min) | COLUMN E | COLUMN F | COLUMN G | COLUMN H | COLUMN I | COLUMN J |
|---|---|---|---|---|---|---|
| 0–2 | Adsorption | Evacuation | Rinse 2 | Desorption | Desorption | Rinse 1 |
| 2–4 | " | Repressure | Evacuation | Rinse 2 | " | " |
| 4–6 | Rinse 1 | Adsorption | " | " | " | Desorption |
| 6–8 | " | " | Repressure | Evacuation | Rinse 2 | " |
| 8–10 | Desorption | Rinse 1 | Adsorption | " | " | " |
| 10–12 | " | " | " | Repressure | Evacuation | Rinse 2 |
| 12–14 | " | Desorption | Rinse 1 | Adsorption | " | " |
| 14–16 | Rinse 2 | " | " | " | Repressure | Evacuation |
| 16–18 | " | " | Desorption | Rinse 1 | Adsorption | " |
| 18–20 | Evacuation | Rinse 2 | " | " | " | Repressure |
| 20–22 | " | " | " | Desorption | Rinse 1 | Adsorption |
| 22–24 | Repressure | Evacuation | Rinse 2 | " | " | " |

TABLE 4

| Valve | 0–1 | 1–2 | 2–3 | 3–4 | 4–5 | 5–6 | 6–7 | 7–8 | 8–9 | 9–10 | 10–11 | 11–12 | 12–13 | 13–14 |
|---|---|---|---|---|---|---|---|---|---|---|---|---|---|---|
| 101 | O | O | O | O | C | C | C | C | C | C | C | C | C | C |
| 102 | C | C | C | C | O | O | O | O | C | C | C | C | C | C |
| 103 | C | C | C | C | C | C | C | O | O | O | O | O | C | C |
| 104 | C | C | C | C | C | C | C | C | C | C | C | C | O | O |
| 105 | C | C | C | C | C | C | C | C | C | C | C | C | C | C |
| 106 | C | C | C | C | C | C | C | C | C | C | C | C | C | C |
| 108 | O | O | O | O | C | C | C | C | C | C | C | C | C | C |
| 109 | C | C | O | O | O | O | O | O | C | C | C | C | C | C |
| 110 | C | C | C | C | C | C | O | O | O | O | O | O | C | C |
| 111 | C | C | C | C | C | C | C | C | C | C | O | O | O | O |
| 112 | C | C | C | C | C | C | C | C | C | C | C | C | C | C |
| 113 | C | C | C | C | C | C | C | C | C | C | C | C | C | C |
| 116 | C | C | C | C | O | O | O | O | C | C | C | C | C | C |
| 117 | C | C | C | C | C | C | C | C | O | O | O | O | C | C |
| 118 | C | C | C | C | C | C | C | C | C | C | C | C | O | O |
| 119 | C | C | C | C | C | C | C | C | C | C | C | C | C | C |
| 120 | C | C | C | C | C | C | C | C | C | C | C | C | C | C |
| 121 | O | O | O | O | C | C | C | C | C | C | C | C | C | C |
| 122 | C | C | C | C | O | O | O | O | C | C | C | C | C | C |
| 123 | C | C | C | C | C | C | C | C | O | O | O | O | C | C |
| 124 | C | C | C | C | C | C | C | C | C | C | C | C | O | O |
| 125 | C | C | C | C | C | C | C | C | C | C | C | C | C | C |
| 126 | C | C | C | C | C | C | C | C | C | C | C | C | C | C |
| 127 | O | O | O | O | C | C | C | C | C | C | C | C | C | C |
| 131 | C | C | C | C | C | C | C | C | O | O | O | O | C | C |
| 132 | C | C | C | C | C | C | C | C | C | C | C | C | O | O |
| 133 | C | C | C | C | C | C | C | C | C | C | C | C | C | C |
| 134 | C | C | C | C | C | C | C | C | C | C | C | C | C | C |
| 135 | O | O | O | O | C | C | C | C | C | C | C | C | C | C |
| 136 | C | C | C | C | O | O | O | O | C | C | C | C | C | C |

| Valve | 0–1 | 1–2 | 2–3 | 3–4 | 4–5 | 5–6 | 6–7 | 7–8 | 8–9 | 9–10 | 10–11 | 11–12 | 12–13 | 13–14 |
|---|---|---|---|---|---|---|---|---|---|---|---|---|---|---|
| 140 | O | O | C | C | O | O | C | C | O | O | C | C | O | O |
| 142 C | C | O | O | C | C | O | O | C | C | O | O | C | O | C |
| 146 | C | C | C | C | C | C | C | C | C | C | C | C | O | O |
| 147 | C | C | C | C | C | C | C | C | C | C | C | C | C | C |
| 148 | C | C | C | C | C | C | C | C | C | C | C | C | C | C |
| 149 | O | O | C | C | C | C | C | C | C | C | C | C | C | C |
| 150 | C | C | C | C | O | O | C | C | C | C | C | C | C | C |
| 151 | C | C | C | C | C | C | C | O | O | C | C | C | C | C |
| 161 | C | C | C | C | C | C | C | C | C | C | C | C | C | C |
| 162 | C | C | C | C | C | C | C | C | C | C | C | C | C | C |
| 163 | O | O | C | C | C | C | C | C | C | C | C | C | C | C |
| 164 | C | C | O | O | O | O | C | C | C | C | C | C | C | C |
| 165 | C | C | C | C | C | C | O | O | O | C | C | C | C | C |
| 166 | C | C | C | C | C | C | C | C | C | C | C | O | O | O |
| 167 | C | C | C | C | C | C | C | C | C | C | C | C | C | C |
| 168 | C | C | C | C | C | C | C | C | C | C | C | C | C | C |
| 169 | O | O | C | C | C | C | C | C | C | C | C | C | C | C |
| 170 | C | C | O | O | O | O | C | C | C | C | C | C | C | C |
| 171 | C | C | C | C | C | C | O | O | O | C | C | C | C | C |
| 172 | C | C | C | C | C | C | C | C | C | O | O | O | O | O |

TABLE 4-continued

| Valve | | | | | | | | | | | | | | |
|---|---|---|---|---|---|---|---|---|---|---|---|---|---|---|
| 182 | C | C | C | C | C | C | C | C | C | C | C | C | C | C |
| 183 | O | O | C | C | C | C | C | C | C | C | C | C | C | C |
| 184 | C | C | O | O | O | O | C | C | C | C | C | C | C | C |
| 185 | C | C | C | C | C | C | O | O | O | O | C | C | C | C |
| 186 | C | C | C | C | C | C | C | C | C | C | O | O | O | O |
| 187 | C | C | C | C | C | C | C | C | C | C | C | C | C | C |

| | Time (Minutes) | | | | | | | | | |
|---|---|---|---|---|---|---|---|---|---|---|
| Valve | 14–15 | 15–16 | 16–17 | 17–18 | 18–19 | 19–20 | 20–21 | 21–22 | 22–23 | 23–24 |
| 101 | C | C | C | C | C | C | C | C | C | C |
| 102 | O | | | | | | | | | |
| 120 | C | C | C | C | C | C | O | O | O | O |
| 121 | C | C | C | C | C | C | C | C | C | C |
| 122 | C | C | C | C | C | C | C | C | C | C |
| 123 | C | C | C | C | C | C | C | C | C | C |
| 124 | O | O | C | C | C | C | C | C | C | C |
| 125 | C | C | O | O | O | O | C | C | C | C |
| 126 | C | C | C | C | C | C | O | O | O | O |
| 127 | C | C | C | C | C | C | C | C | C | C |
| 131 | C | C | C | C | C | C | C | C | C | C |
| 132 | O | O | C | C | C | C | C | C | C | C |
| 133 | C | C | O | O | O | O | C | C | C | C |
| 134 | C | C | C | C | C | C | O | O | O | O |
| 135 | C | C | C | C | C | C | C | C | C | C |
| 136 | C | C | C | C | C | C | C | C | C | C |

| | Time (Minutes) | | | | | | | | | |
|---|---|---|---|---|---|---|---|---|---|---|
| Valve | 14–15 | 15–16 | 16–17 | 17–18 | 18–19 | 19–20 | 20–21 | 21–22 | 22–23 | 23–24 |
| 140 | C | C | O | O | C | C | O | O | C | C |
| 142 | O | O | C | C | O | O | C | C | O | O |
| 146 | C | C | C | C | C | C | C | C | C | C |
| 147 | C | C | O | O | C | C | C | C | C | C |
| 148 | C | C | C | C | C | C | O | O | C | C |
| 149 | C | C | C | C | C | C | C | C | C | C |
| 150 | C | C | C | C | C | C | C | C | C | C |
| 151 | C | C | C | C | C | C | C | C | C | C |
| 161 | O | O | O | O | C | C | C | C | C | C |
| 162 | C | C | C | C | O | O | O | O | C | C |
| 163 | C | C | C | C | C | C | C | C | O | O |
| 164 | C | C | C | C | C | C | C | C | C | C |
| 165 | C | C | C | C | C | C | C | C | C | C |
| 166 | C | C | C | C | C | C | C | C | C | C |
| 167 | O | O | O | O | C | C | C | C | C | C |
| 168 | C | C | C | C | O | O | O | O | C | C |
| 169 | C | C | C | C | C | C | C | C | O | O |
| 170 | C | C | C | C | C | C | C | C | C | C |
| 171 | C | C | C | C | C | C | C | C | C | C |
| 172 | C | C | C | C | C | C | C | C | C | C |
| 182 | C | C | C | C | O | O | O | O | C | C |
| 183 | C | C | C | C | C | C | C | C | O | O |
| 184 | C | C | C | C | C | C | C | C | C | C |
| 185 | C | C | C | C | C | C | C | C | C | C |
| 186 | C | C | C | C | C | C | C | C | C | C |
| 187 | O | O | O | O | C | C | C | C | C | C |

Although the process in the several embodiments has been described in particular with reference to $CO_2$-$H_2$ separation, it is also applicable to feed mixtures containing trace amounts of other contaminants, such as water and $C_1$ to $C_4$ hydrocarbons.

While other adsorbents capable of retaining the undesired component of the feed gas mixture may be employed, as hereinabove indicated, the use of activated carbon is particularly preferred especially in the case of $CO_2$-$H_2$ separation. As compared, for example, with 5A molecular sieve adsorbent, activated carbon provides a larger working capacity, lower heat of sorption and more favorable desorption characteristics for the $CO_2$-$H_2$ system.

The efficiency of the process of the invention as applied to separation of a binary gas mixture is illustrated in the following example.

EXAMPLE 1

A feed gas mixture containing 75 mol% $H_2$ and 25 mol% $CO_2$ was fed into an adsorbent column containing 1 kilogram of BPL activated carbon previously saturated with hydrogen at the feed gas pressure. The feed gas was at a pressure of 28.2 atmospheres and at a temperature of 22.0° C. The column was 2 inches (=5.08 cm) in internal diameter and 40 inches (=101.6 cm) in length.

The feed gas was passed through the column for 6.5 minutes at the rate of 40.1 standard liters per minute. An effluent containing 99.99 mol % $H_2$ was produced. The total volume of the effluent was 246.2 standard liters. 188.7 standard liters of this gas was withdrawn as the primary hydrogen product, the remaining 57.5 standard liters was reused to pressurize the column to the feed pressure level. Introduction of the feed gas was then discontinued and a stream of $CO_2$ at 28.2 atmospheres was introduced into the column in the same direction as that of the feed gas. The $CO_2$ flow rate was 35.2 standard liters per minute and was continued for a period of 2.28 minutes. The effluent gas during this rinse step amounted to 36.1 standard liters which was recycled as feed gas.

The column was then depressured in five minutes to one atmosphere, in a direction countercurrent to that of the feed gas flow. During this reduction in pressure, a desorbed gas effluent was obtained consisting essentially of pure $CO_2$ in total amount of 103.3 standard liters, of which 80.2 standard liters was recompressed and utilized as high pressure rinse gas. The remaining 23.1 standard liters of the desorbed $CO_2$ was withdrawn as the secondary product stream. The column was then purged for five minutes with ambient air in a direction countercurrent to that of feed gas introduction, using an air flow rate of 13.5 standard liters per minute. Finally, the column was evacuated in three minutes to 100 torr., in a direction countercurrent to that of feed gas introduction.

In the above-described experimental run, the total amount of fresh hydrogen introduced as feed in one complete cycle was 195.5 standard liters of which 188.7 standard liters of hydrogen product was recovered at a purity of 99.99 mol %. This corresponds to a hydrogen recovery of 96.5% from the feed mixture. The corresponding recovery of essentially pure $CO_2$ from the feed was 35.5%. Higher recoveries are obtainable in efficiently operated commercial size installations.

What is claimed is:

1. The method of separating the components of a gaseous mixture into a primary gaseous product and a secondary gaseous product, in a system comprising a plurality of adsorption zones operated in cycle in a predetermined timed sequence, each of which adsorption zones contains a bed of solid sorbent preferentially selective for said secondary gaseous product component, which method comprises the following sequence of operational steps performed in the order recited in each of said adsorption zones in its turn:
   (a) during a predetermined time period introducing the gaseous mixture to be separated to one of said adsorption zones and passing the same through the bed of sorbent in said zone while discharging from said zone unsorbed gas as primary gaseous product, said adsorption zone having been previously brought to desired superatmospheric feed gas pressure with primary gaseous product withdrawn from another adsorbent zone of said system;
   (b) terminating operation of step (a) above as applied to the designated adsorbent zone and rinsing said zone in the direction of initial feed gas flow therethrough, with a stream of recompressed secondary gaseous product and at about the prevailing superatmospheric pressure of said adsorbent zone, while discharging from said zone a gaseous rinse effluent which is recycled to another adsorption zone of said system then undergoing step (a) for admixture with gaseous feed mixture being admitted to said other adsorption zone;
   (c) lowering to an intermediate level the pressure in the zone that has undergone step (b) to desorb from said zone residual gas therein present and withdrawing said residual gas from said zone in a direction counter to that of earlier feed gas flow therein, said withdrawn residual gas being recompressed for use, at least in part, to rinse an adsorption zone of said system undergoing step (b);
   (d) at about said intermediate pressure level purging the zone that has just undergone step (c) with air or an inert gas less strongly sorbed than said secondary gaseous product component of the feed gas mixture; thereafter
   (e) evacuating the thus purged zone to a sub-atmospheric pressure level to remove therefrom purge gas introduced in step (d), and
   (f) repressuring the zone to about the feed pressure of step (a) by admission thereto of a part of the primary product gas component withdrawn from an adsorption zone of said series then undergoing step (a).

2. The method as defined in claim 1 wherein said gaseous mixture to be separated comprises hydrogen in admixture with at least one gas from the group consisting of $CO_2$ and $CH_4$.

3. The method as defined in claim 2 wherein said secondary product gas component is non-combustible and air is utilized as purge gas in step (d).

4. The method as defined in claim 2 wherein an inert gas is utilized as purge gas in step (d).

5. The method as defined in claim 2 wherein said system comprises four adsorbent zones in parallel operation, and the recompressed gas from step (c) is stored for subsequent use in an adsorption zone undergoing step (b).

6. The method as defined in claim 2 wherein said system comprises six adsorbent zones in parallel operation and the recompressed gas from step (c) is sent directly to another adsorption zone of said system then undergoing step (b).

7. The method as defined in claim 1 wherein said gaseous mixture to be separated comprises predominantly hydrogen, in admixture with a lesser quantity of $CO_2$.

8. The method as defined in claim 7 wherein the solid sorbent comprises activated carbon.

9. The method as defined in claim 1 wherein said gaseous mixture to be separated comprises $CO_2$ in admixture with methane.

10. The method as defined in claim 1 wherein said system comprises four adsorbent zones in parallel operation, and the recompressed gas from step (c) is stored for subsequent use in an adsorption zone undergoing step (b).

11. The method as defined in claim 1 wherein said system comprises six adsorbent beds in parallel operation and the recompressed gas from step (c) is sent directly to another adsorption zone of said system then undergoing step (b).

12. The method as defined in claim 1 wherein said evacuation of the adsorption zone undergoing step (e) is effected in a direction counter to that of initial passage of the feed gas mixture through said zone.

13. The method as defined in claim 1 wherein said evacuation of the adsorption zone undergoing step (e) is effected simultaneously at opposite ends of said zone.

14. The method as defined in claim 1 wherein said evacuation of the adsorption zone undergoing step (e) is effected at a position intermediate the feed and discharge ends of the column.

15. The method as defined in claim 1 wherein the solid sorbent comprises activated carbon.

* * * * *